(12) United States Patent
Sirkett et al.

(10) Patent No.: US 11,230,011 B2
(45) Date of Patent: Jan. 25, 2022

(54) ROBOT SYSTEM CALIBRATION

(71) Applicant: ABB Schweiz AG, Baden (CH)

(72) Inventors: Daniel Sirkett, Västerås (SE); Jeremy Pouech, Buc (FR); Peter Fransson, Västerås (SE)

(73) Assignee: ABB Schweiz AG, Baden (CH)

( * ) Notice: Subject to any disclaimer, the term of this patent is extended or adjusted under 35 U.S.C. 154(b) by 307 days.

(21) Appl. No.: 16/061,237

(22) PCT Filed: Feb. 2, 2016

(86) PCT No.: PCT/EP2016/052130
§ 371 (c)(1),
(2) Date: Jun. 11, 2018

(87) PCT Pub. No.: WO2017/133756
PCT Pub. Date: Aug. 10, 2017

(65) Prior Publication Data
US 2018/0354137 A1 Dec. 13, 2018

(51) Int. Cl.
*B25J 9/16* (2006.01)
(52) U.S. Cl.
CPC ... *B25J 9/1692* (2013.01); *G05B 2219/40611* (2013.01)
(58) Field of Classification Search
CPC .... B62J 9/16; B62J 9/00; B62J 9/1692; F16D 27/01
See application file for complete search history.

(56) References Cited

U.S. PATENT DOCUMENTS

| 4,570,065 A | * | 2/1986 | Pryor | B25J 18/002 |
| | | | | 250/227.11 |
| 4,613,942 A | | 9/1986 | Chen | |
| 5,506,682 A | | 4/1996 | Pryor | |
| 5,802,201 A | | 9/1998 | Nayar et al. | |

(Continued)

FOREIGN PATENT DOCUMENTS

| JP | 2006082170 | * | 3/2006 | ............. B25J 13/08 |
| JP | 2006082170 A | | 3/2006 | |

(Continued)

OTHER PUBLICATIONS

International Search Report and Written Opinion of the International Searching Authority Application No. PCT/EP2016/052130 Completed: Oct. 18, 2016; dated Oct. 26, 2016 13 pages.

(Continued)

*Primary Examiner* — Kira Nguyen
(74) *Attorney, Agent, or Firm* — Whitmyer IP Group LLC

(57) ABSTRACT

A method for calibrating a robot system having a planar pick surface includes: bringing a robot gripper to a first location against the pick surface; and generating a first image of the robot gripper from below. When knowing that a certain identifiable part of the robot gripper in images always lies against the planar pick surface, the position and orientation of the pick surface in relation to a manipulator coordinate frame can be fully defined if the robot gripper's orientation in relation to the pick surface is known, or if there are images on identifiable parts of the robot gripper in at least three different positions against the pick surface.

20 Claims, 2 Drawing Sheets

(56) References Cited

U.S. PATENT DOCUMENTS

| | | | |
|---|---|---|---|
| 6,167,607 B1* | 1/2001 | Pryor | A01B 69/008 29/407.04 |
| 2014/0018957 A1* | 1/2014 | Matsumoto | B25J 9/1697 700/251 |
| 2014/0100694 A1* | 4/2014 | Rueckl | B25J 9/1692 700/254 |
| 2015/0025683 A1* | 1/2015 | Amano | B25J 9/1692 700/254 |
| 2015/0142171 A1 | 5/2015 | Li et al. | |
| 2015/0224649 A1* | 8/2015 | Watanabe | B25J 9/1607 700/259 |
| 2016/0059419 A1* | 3/2016 | Suzuki | B25J 9/1697 700/114 |
| 2016/0214255 A1* | 7/2016 | Uhlenbrock | B25J 9/1653 |

FOREIGN PATENT DOCUMENTS

| | | |
|---|---|---|
| JP | 2015016527 A | 1/2015 |
| WO | 2012076038 A1 | 6/2012 |
| WO | 2014161603 A1 | 10/2014 |

OTHER PUBLICATIONS

Paul Y Oh et al: "Visual Servoing by Partitioning Degrees of Freedom", IEEE Transactions on Robotics and Automation, IEE Inc, New York, US, Feb. 1, 2001.

* cited by examiner

ROBOT SYSTEM CALIBRATION

TECHNICAL FIELD

The present invention relates to calibration of a vision system coordinate frame in relation to a manipulator coordinate frame in a robot system.

BACKGROUND

There is a relatively simple conventional method to calibrate a manipulator coordinate frame in relation to another immobile object such as a welding jig by jogging a calibration pointer at a robot end effector to predefined target points at the welding jig, and calculating on the basis of the respective positions of the calibration pointer in the manipulator coordinate frame a position and an orientation of the welding jig in the manipulator coordinate frame. It is furthermore conventionally known e.g. from WO2012076038A1 and WO2014161603A1 to calibrate a vision system coordinate frame in relation to a manipulator coordinate frame by moving an end effector provided with a calibration marker to a plurality of known target points in the manipulator coordinate frame, and calculating the respective positions in the vision system coordinate frame based on images on the calibration marker.

Methods where jogging of a manipulator to predefined target points is required involve drawbacks such as the methods being time consuming, error prone, and, in order to be accurate, requiring high skills from the operator carrying them out. Methods based on automatic calibration procedures are complicated and difficult to develop, and they are also time consuming as a large number of target points is required for good accuracy.

SUMMARY

One object of the invention is to provide an improved method for calibrating a robot system, which method is fast, simple and accurate, and does not require high skills from the operator carrying it out.

These objects are achieved by the method and device according to the invention.

The invention is based on the realization that when knowing that a certain identifiable part of a robot gripper in images always lies against a planar pick surface, the position and orientation of the pick surface in relation to a manipulator coordinate frame of a manipulator moving the robot gripper can be fully defined if the robot gripper's orientation in relation to the pick surface is known, or if there are images on identifiable parts of the robot gripper in at least three different positions against the pick surface, the at least three different positions not lying in line.

According to a first aspect of the invention, there is provided a method for calibrating a robot system comprising a planar pick surface. The method comprises the step of bringing a robot gripper to a first location against the pick surface. The method further comprises the step of generating a first image of the robot gripper from below.

According to one embodiment of the invention, the method further comprises the steps of: moving the robot gripper to a second location against the pick surface; and generating a second image of the robot gripper from below.

According to one embodiment of the invention, the method further comprises the step of rotating the robot gripper about an axis perpendicular to the pick surface.

According to one embodiment of the invention, the method further comprises the steps of: moving the robot gripper to a third location against the pick surface; and generating a third image of the robot gripper from below.

According to one embodiment of the invention, the robot gripper comprises at least one detection mark which is configured such that the robot system is allowed to precisely detect the position of it in an image.

According to one embodiment of the invention, at least one generated image comprises an illustration of at least one detection mark.

According to one embodiment of the invention, the orientation of the at least one detection mark in relation to the pick surface is known.

According to one embodiment of the invention, the robot gripper defines a gripper plane which can unambiguously be brought against the pick surface to be parallel with the same.

According to one embodiment of the invention, the gripper plane is defined by at least three individual support points.

According to one embodiment of the invention, the robot gripper is configured to define the gripper plane only during calibration and not during normal operation of the robot system.

According to one embodiment of the invention, the robot gripper comprises at least two detection marks, such as three detection marks.

According to one embodiment of the invention, the robot system further comprises a manipulator for moving the robot gripper within a defined manipulator coordinate frame, the method further comprising the step of: calculating, on the basis of the generated image or images, a correlation between a position and an orientation of the pick surface and the manipulator coordinate frame.

According to a second aspect of the invention, there is provided a robot system comprising: a planar pick surface, a manipulator for moving a robot gripper within a defined manipulator coordinate frame for picking objects from the pick surface, a vision system for generating images on objects on the pick surface, and a control unit for controlling movements of the manipulator and operation of the vision system. The control unit is configured to calculate a correlation between a position and an orientation of the pick surface and the manipulator coordinate frame on the basis of a first image from below of the robot gripper being in contact against the pick surface.

According to one embodiment of the invention, the robot gripper comprises at least one detection mark which is configured such that the robot system is allowed to precisely detect the position of it in an image.

According to one embodiment of the invention, the robot gripper defines a gripper plane which can unambiguously be brought against the pick surface to be parallel with the same.

BRIEF DESCRIPTION OF THE DRAWINGS

The invention will be explained in greater detail with reference to the accompanying drawings, wherein.

DETAILED DESCRIPTION

Figure 1:
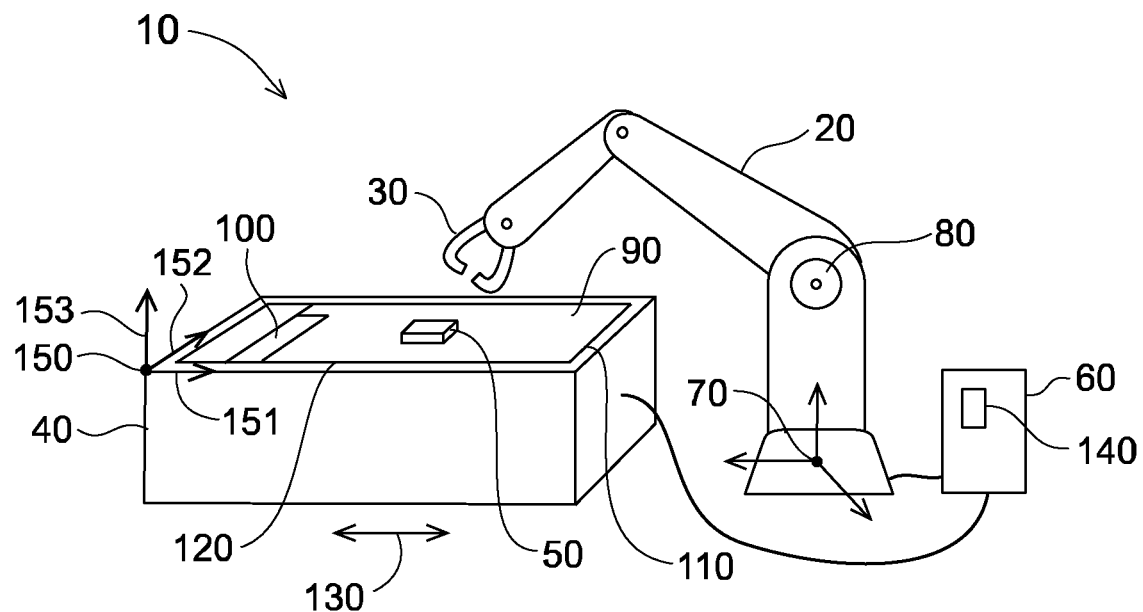
FIG. 1 shows a robot system according to one embodiment of the invention.

Referring to FIG. 1, a robot system 10 according to one embodiment of the invention comprises a manipulator 20 for moving a robot gripper 30, and a vision system 40 for determining positions of objects 50 to be picked by the robot gripper 30. The robot system 10 furthermore comprises a control unit 60 for controlling movements of the manipulator 20, and for controlling operation of the vision system 40. The manipulator 20 has a well-defined coordinate system, a manipulator coordinate frame 70, within which the robot gripper 30 is moved. Each joint 80 of the robot is provided with an actuator for moving the respective joint 80, and with a resolver for determining an angular position of the same. Based on resolver signals the control unit 60 is able to constantly calculate a position and an orientation of the robot gripper 30 in the manipulator coordinate frame 70.

The vision system 40 comprises a transparent and planar pick surface 90 under which a flatbed scanner 100 is arranged for generating 2D images on objects 50 on the pick surface 90. The scanner 100 comprises a contact image sensor (not shown) with a width covering the whole width 110 of the pick surface 90, and configured to move below the pick surface 90 across the length 120 of the same in a scanning direction 130. The control unit 60 contains algorithms 140 which, based on the images on the objects 50, are able to recognize the objects 50 and to determine the positions and orientations of the same in a vision system coordinate frame 150.

Since the manipulator 20 and the vision system 40 are not attached to each other in a predefined relative position, a positional relationship between the manipulator coordinate frame 70 and the vision system coordinate frame 150 is typically not known in advance when the robot system 10 is brought into operation. The robot system 10 therefore needs to be calibrated to determine the position and orientation of the vision system coordinate frame 150 in relation to the manipulator coordinate frame 70. Only thereafter can the position information of an object 50 from the vision system 40 be turned into position information in the manipulator coordinate frame 70, and the robot gripper 30 can be moved to a desired location for picking up the respective object 50.

Figure 3:
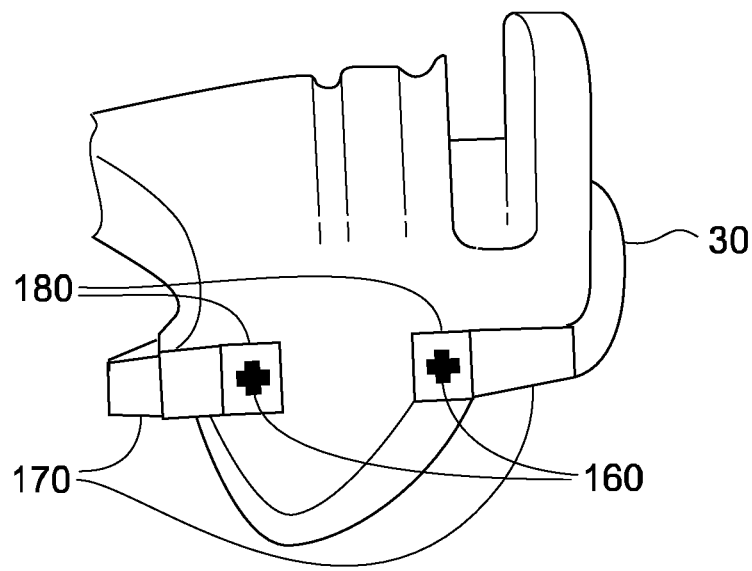
FIG. 3 shows an image of a robot gripper with two detection marks from below.

Since the pick surface 90 is planar and rectangular, it is convenient to define the vision system coordinate frame 150 to be a Cartesian coordinate frame wherein a first axis 151 is in the plane of the pick surface 90 and parallel to the scanning direction 130, a second axis 152 is in the plane of the pick surface 90 and perpendicular to the first axis 151, and a third axis 153 is perpendicular to the first and second axes 151, 152. Assuming that the robot gripper 30 has on it a detection mark 160 (see FIG. 3) whose position in the manipulator coordinate frame 70 is known, by bringing the detection mark 160 in contact against the pick surface 90 at a first location and by determining the position of the detection mark 160 with the help of the vision system 40 in the vision system coordinate frame 150, a correlation between the vision system coordinate frame 150 and the manipulator coordinate frame 70 at the first location can be determined. If the same exercise is repeated at a second location of the pick surface 90, a correlation between the vision system coordinate frame 150 and the manipulator coordinate frame 70 at a first line connecting the first and second locations can be determined. Furthermore, if the same exercise is repeated at a third location of the pick surface 90, whereby the third location does not lie on the first line, a correlation between the vision system coordinate frame 150 and the manipulator coordinate frame 70 can be fully determined.

Consequently, according to one embodiment of the invention the robot system 10 is calibrated by taking the steps of: jogging the manipulator 20 to bring the detection mark 160 against the pick surface 90 at a first location; determining a respective first detection mark position in the vision system coordinate frame 150 with the help of the vision system 40; jogging the manipulator 20 to bring the detection mark 160 against the pick surface 90 at a second location; determining a respective second detection mark position in the vision system coordinate frame 150 with the help of the vision system 40; jogging the manipulator 20 to bring the detection mark 160 against the pick surface 90 at a third location; determining a respective third detection mark position in the vision system coordinate frame 150 with the help of the vision system 40; and calculating a correlation between the vision system coordinate frame 150 and the manipulator coordinate frame 70 on the basis of the first, second and third detection mark positions. In order to achieve a good accuracy of the correlation between the two frames, the first and second locations should be relatively far away from each other, and the third location should be relatively far away from the first line connecting the first and second locations. Furthermore, the detection mark 160 should be configured to allow the vision system 40 to precisely detect the position of it. This can be achieved by giving the detection mark 160 a suitable shape comprising e.g. the form of a cross.

Figure 2:
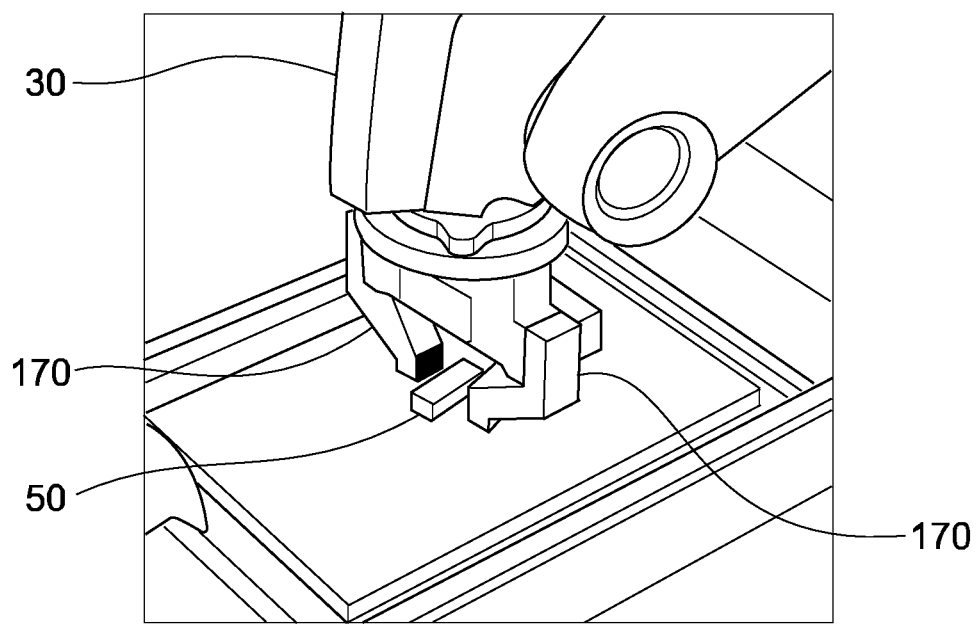
FIG. 2 shows a robot gripper according to one embodiment of the invention.

Referring to FIG. 2, a robot gripper 30 according to one embodiment of the invention comprises two gripping fingers 170 configured to take a hold of an object 50 by pressing the object 50 from two sides. Further referring to FIG. 3, each of the gripping fingers 170 is provided with a detection mark 160 in the form of a cross in the bottom face 180, the two detection marks 160 being of different colors such that they can be distinguished from each other. According to one embodiment of the invention the robot system 10 is calibrated by taking the steps of: opening the robot gripper 30 to be fully open; jogging the manipulator 20 to bring each of the two detection marks 160 against the pick surface 90 at respective fourth and fifth locations; determining respective fourth and fifth detection mark positions in the vision system coordinate frame 150 with the help of the vision system 40; rotating the robot gripper 30 ninety degrees about an axis perpendicular to the pick surface 90 and bringing each of the two detection marks 160 against the pick surface 90 at respective sixth and seventh locations; determining respective sixth and seventh detection mark positions in the vision system coordinate frame 150 with the help of the vision system 40; and calculating a correlation between the vision system coordinate frame 150 and the manipulator coordinate frame 70 on the basis of the fourth, fifth, sixth and seventh detection mark positions.

That is, when the robot gripper 30 has two detection marks 160 that are both brought against the pick surface 90 during the calibration, only two robot gripper locations/orientations are required to fully determine a correlation between the vision system coordinate frame 150 and the manipulator coordinate frame 70, provided that it is known which detection mark 160 is at each of the four detection mark positions. In order to achieve a good accuracy of the correlation between the two frames, the fourth and fifth locations, and the sixth and seventh locations, respectively, should be relatively far away from each other.

Since the distance between the aforementioned two detection marks 160 is typically quite limited because of a limited distance between the two gripping fingers 170 in a fully open position of the robot gripper 30, compared to the previously described embodiment of the invention the robot system 10 may be more accurately calibrated by taking the steps of: opening the robot gripper 30 to be fully open; jogging the manipulator 20 to bring each of the two detection marks 160 against the pick surface 90 at respective eighth and ninth locations close to a first corner of the pick surface 90; determining respective eighth and ninth detection mark positions in the vision system coordinate frame 150 with the help of the vision system 40; jogging the manipulator 20 to bring each of the two detection marks 160 against the pick surface 90 at respective tenth and eleventh locations close to a second corner of the pick surface 90 opposite to the first corner; determining respective tenth and eleventh detection mark positions in the vision system coordinate frame 150 with the help of the vision system 40; and calculating a correlation between the vision system coordinate frame 150 and the manipulator coordinate frame 70 on the basis of the eighth, ninth, tenth and eleventh detection mark positions. It is to be noted that according to this embodiment of the invention the two detection marks 160 can be identical (of the same shape and color) as the control unit 60 is able to distinguish them from each other on the basis of movements in the manipulator coordinate frame 70. Optionally this embodiment of the invention may be complemented by jogging the manipulator 20 to bring each of the two detection marks 160 against the pick surface 90 at an additional location or additional locations of the pick surface 90, such as at locations close to third and fourth corners of the pick surface 90, to be able to calculate an even more accurate correlation between the vision system coordinate frame 150 and the manipulator coordinate frame 70.

Figure 4:
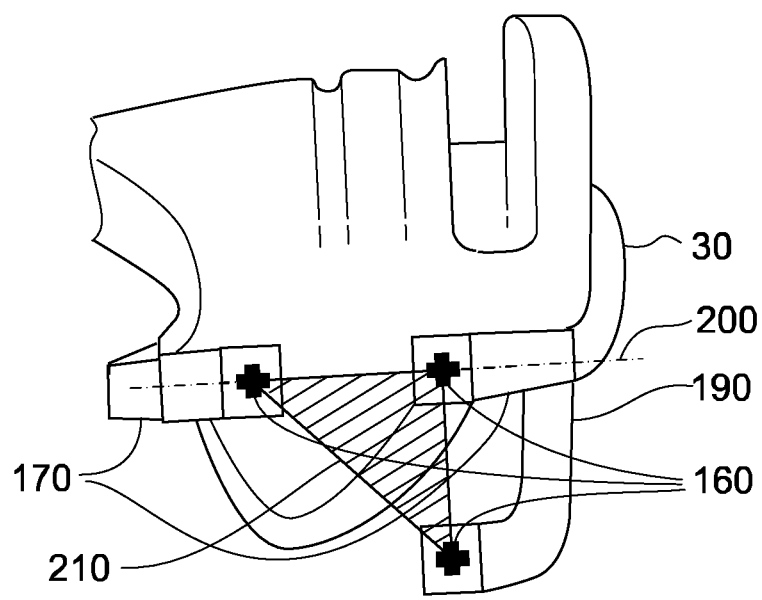
FIG. 4 shows an image of a robot gripper with three detection marks from below.

Referring to FIG. 4, according to one embodiment of the invention in addition to the two detection marks 160 at the gripping fingers 170 the robot gripper 30 is provided with a third detection mark 160 at a calibration aid 190 temporarily attached to the robot gripper 30 for facilitating the calibration, and the robot system 10 is calibrated by taking the steps of: opening the robot gripper 30 to be fully open; jogging the manipulator 20 to bring each of the three detection marks 160 against the pick surface 90 at respective twelfth, thirteenth and fourteenth locations; determining respective twelfth, thirteenth and fourteenth detection mark positions in the vision system coordinate frame 150 with the help of the vision system 40; and calculating a correlation between the vision system coordinate frame 150 and the manipulator coordinate frame 70 on the basis of the twelfth, thirteenth and fourteenth detection mark positions.

That is, when the robot gripper 30 has three detection marks 160 that are all brought against the pick surface 90 during the calibration, only one robot gripper location is required to fully determine a correlation between the vision system coordinate frame 150 and the manipulator coordinate frame 70, provided that it is known which detection mark 160 is at each of the three detection mark positions. In order to achieve a good accuracy of the correlation between the two frames, the twelfth, thirteenth and fourteenth locations should be relatively far away from each other, and the fourteenth location should be relatively far away from a second line 200 connecting the twelfth and thirteenth locations. Optionally this embodiment of the invention may be complemented by jogging the manipulator 20 to bring each of the three detection marks 160 against the pick surface 90 at an additional location or additional locations of the pick surface 90, to be able to calculate an even more accurate correlation between the vision system coordinate frame 150 and the manipulator coordinate frame 70.

In all the previously described embodiments of the invention at least three detection mark positions in the vision system coordinate frame 150 are required for calculating a correlation between the vision system coordinate frame 150 and the manipulator coordinate frame 70. However, if a detection mark's 160 orientation in relation to the vision system coordinate frame 150 is known, it suffices with a single detection mark position in the vision system coordinate frame 150 to fully determine a correlation between the vision system coordinate frame 150 and the manipulator coordinate frame 70. The three detection marks 160 of the previous embodiment can thereby be considered to constitute a single large detection mark 160 whose orientation in relation to the vision system coordinate frame 150 can be unambiguously established by bringing all the three detection marks 160 against the pick surface 90. The three detection marks 160 namely function as three individual support points defining a gripper plane 210 that can unambiguously be brought against the pick surface 90 to be parallel with the same. The parallelism of the gripper plane 210 and the pick surface 90 constrains the orientation of the detection marks 160 with respect to the first (in the plane of the pick surface 90 and parallel to the scanning direction 130) and second (in the plane of the pick surface 90 and perpendicular to the first axis 151) axes 151, 152 of the vision system coordinate frame 150, and the orientation of the detection marks 160 with respect to the third axis 153 (perpendicular to the first and second axes 151, 152) of the vision system coordinate frame 150 can be calculated out of the mutual positions of the detection marks 160 in the vision system coordinate frame 150.

Furthermore, assuming certain constraints between the manipulator coordinate frame 70 and the vision system coordinate frame 150 affects on the number of required detection mark positions in the vision system coordinate frame 150 to fully determine a correlation between the vision system coordinate frame 150 and the manipulator coordinate frame 70. For example, if it is assumed that the pick surface 90 is parallel with a plane in the manipulator coordinate frame 70 (the vision system 40 and the manipulator 20 both standing on a planar foundation), it suffices with two detection mark positions in the vision system coordinate frame 150 to fully determine a correlation between the vision system coordinate frame 150 and the manipulator coordinate frame 70, provided that it is known which detection mark 160 is at each of the two detection mark positions.

Furthermore, if a detection mark's 160 orientation in relation to the vision system coordinate frame 150 with respect to the first and second axes 151, 152 is known, it suffices with two detection mark positions in the vision system coordinate frame 150 to fully determine a correlation between the vision system coordinate frame 150 and the manipulator coordinate frame 70, provided that it is known which detection mark 160 is at each of the two detection mark positions. Therefore, in the case of the robot gripper 30 of FIG. 3, bringing the both detection marks 160 against the pick surface 90 and perpendicular to the same enables to fully determine a correlation between the vision system coordinate frame 150 and the manipulator coordinate frame 70 if the two detection marks 160 can be separated e.g. by color or shape.

It is to be understood that any suitable means other than support points defining a gripper plane 210 can be used for defining a detection mark's 160 orientation in relation to the vision system coordinate frame 150. For example, in some applications a skillful operator can be considered capable of bringing a detection mark 160 into a certain orientation in relation to the vision system coordinate frame 150 with a sufficient accuracy by eye.

When a gripper plane 210 is defined with the help of at least three support points, the vision system 40 needs to be able to distinguish the support points from each other. This can be achieved e.g. by arranging the support points not to be symmetrical about a point (symmetry about a line being allowed), or by separating the support points by color or shape. Alternatively, distinguishing the support points can be achieved by bringing the support points into contact with the pick surface 90 at more than one robot gripper locations, which allows the control unit 60 to distinguish the support points from each other by calculations on the basis of movements in the manipulator coordinate frame 70. It is to be understood that not all the support points need to be configured as detection marks 160; it suffices also e.g. with two detection marks 160 and one additional support point. Alternatively, a gripper plane 210 can be defined e.g. by a planar portion of the robot gripper 30 that is large enough to be unambiguously brought against the pick surface 90 to be parallel with the same. Such planar portion should comprise at least one detection mark 160, preferably two, or function in its entirety as a detection mark 160 whose direction can be determined, to enable the vision system 40 to determine its position and orientation in the vision system coordinate frame 150. A relatively large (non-symmetrical) cross in a plane can thereby function both as a detection mark 160 and as a planar portion defining a gripper plane 210.

As explained hereinbefore, at least in some occasions there is a need to know which detection mark 160 is at each of the respective detection mark positions. In the case of two detection marks 160 this can be achieved by separating the detection marks 160 by color or shape, and in the case of three or more detection marks 160 this can additionally be achieved by arranging the detection marks 160 in a non-symmetrical way. Additionally, any number of detection marks 160 can distinguished from each other by bringing the detection marks 160 into contact with the pick surface 90 at more than one robot gripper locations, which allows the control unit 60 to distinguish the detection marks 160 from each other by calculations on the basis of movements in the manipulator coordinate frame 70. After completing a calibration, feedback regarding success of the same can be given to an operator e.g. by configuring the control unit 60 to move the robot gripper 30 close to the pick surface 90 along the contours of the same.

In all the examples given above it is assumed that the positions of all the detection marks 160 and support points are known in the manipulator coordinate frame 70. It is furthermore assumed that a person skilled in the art is able to program the control unit 60 to carry out all the calculations that have been referred to, and therefore no detailed disclosure on how such calculations are to be carried out is considered necessary.

In the context of the present disclosure the term "image" shall be considered to cover not only a visible illustration of a thing, but also any information on the basis of which such visible illustration can be generated. For example, the scanner 100 provides numerical information on the basis of which a visible illustration of a part can be generated. However, it may not be necessary to generate the visible illustration for the purposes of the present invention but processing of the numerical information may suffice. Moreover, the generation of the images may be based on other physical phenomena than visible light. The pick surface 90 can thereby consist of any suitable planar plate that can either be transparent or opaque.

The invention is not limited to the embodiments shown above, but the person skilled in the art may modify them in a plurality of ways within the scope of the invention as defined by the claims. Thus, for example, the invention is not limited to a method where the manipulator 20 is during calibration jogged manually by an operator to bring the robot gripper 30 against the pick surface 90, but this step of the method can also be carried out by an appropriately equipped and programmed robot system 10.

The invention claimed is:

1. A method for calibrating a robot system comprising a planar pick surface, the method including the steps of:
   bringing a robot gripper to a first location against the pick surface, and
   generating a first image of the robot gripper from below while the robot gripper is in contact with the pick surface.

2. The method according to claim 1, wherein the method further includes the steps of:
   moving the robot gripper to a second location against the pick surface; and
   generating a second image of the robot gripper from below.

3. The method according to claim 2, wherein the method further includes the step of:
   rotating the robot gripper about an axis perpendicular to the pick surface.

4. The method according to claim 2, wherein the method further includes the steps of:
   moving the robot gripper to a third location against the pick surface; and
   generating a third image of the robot gripper from below.

5. The method according to claim 2, wherein the robot gripper includes at least one detection mark and wherein the method further includes the step of detecting a position of the at least one detection mark in each of the first and second images.

6. The method according to claim 1, wherein the method further includes the steps of:
   moving the robot gripper to a third location against the pick surface; and
   generating a third image of the robot gripper from below.

7. The method according to claim 1, wherein the robot gripper includes at least one detection mark and wherein the method further includes the step of detecting a position of the at least one detection mark in the first image.

8. The method according to claim 7, wherein the first image includes an illustration of the at least one detection mark.

9. The method according to claim 8, wherein an orientation of the at least one detection mark in relation to the pick surface is known.

10. The method according to claim 7, wherein an orientation of the at least one detection mark in relation to the pick surface is known.

11. The method according to claim 10, wherein the robot gripper defines a gripper plane, and wherein the step of bringing the robot gripper to the first location comprises bringing the gripper plane against the pick surface to be parallel with the pick surface.

12. The method according to claim 11, wherein the gripper plane is defined by at least three individual support points.

13. The method according to claim 12, wherein the method further includes the step of defining the gripper plane only during calibration and not during normal operation of the robot system.

14. The method according to claim 11, wherein the the method further includes the step of defining the gripper plan only during calibration and not during normal operation of the robot system.

15. The method according to claim 7, wherein the step of detecting comprises detecting positions of three detection marks.

16. The method according to claim 1, wherein the robot system further includes a manipulator for moving the robot gripper within a defined manipulator coordinate frame, the method further including the step of:

calculating, on the basis of the first image, a correlation between a position and an orientation of the pick surface and the manipulator coordinate frame.

17. A robot system including: a planar pick surface, a manipulator for moving a robot gripper within a defined manipulator coordinate frame for picking objects from the pick surface, a vision system for generating images of objects on the pick surface, and a control unit for controlling movements of the manipulator and operation of the vision system, wherein the control unit is configured to calculate a correlation between a position and an orientation of the pick surface and the manipulator coordinate frame on the basis of a first image from below of the robot gripper being in contact against the pick surface.

18. The robot system according to claim 17, wherein the robot gripper includes at least one detection mark which is configured such that the robot system is allowed to detect a position of the at least one detection mark in the first image.

19. The robot system according to claim 18, wherein the robot gripper defines a gripper plane and is configured to bring the gripper plane against the pick surface to be parallel with the pick surface.

20. The robot system according to claim 17, wherein the robot gripper defines a gripper plane and is configured to bring the gripper plane against the pick surface to be parallel with the pick surface.

* * * * *